3,524,702
Patented Aug. 18, 1970

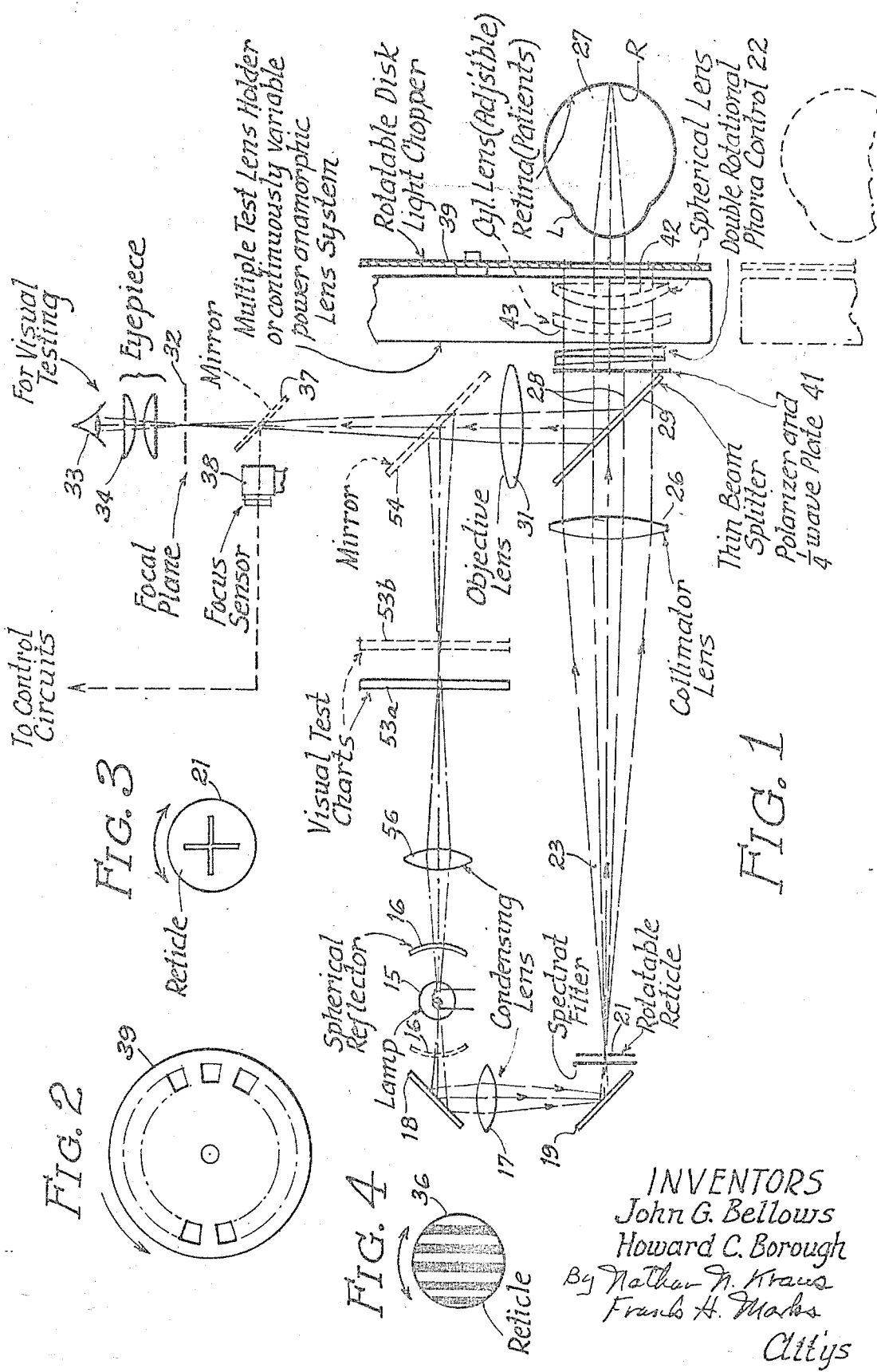

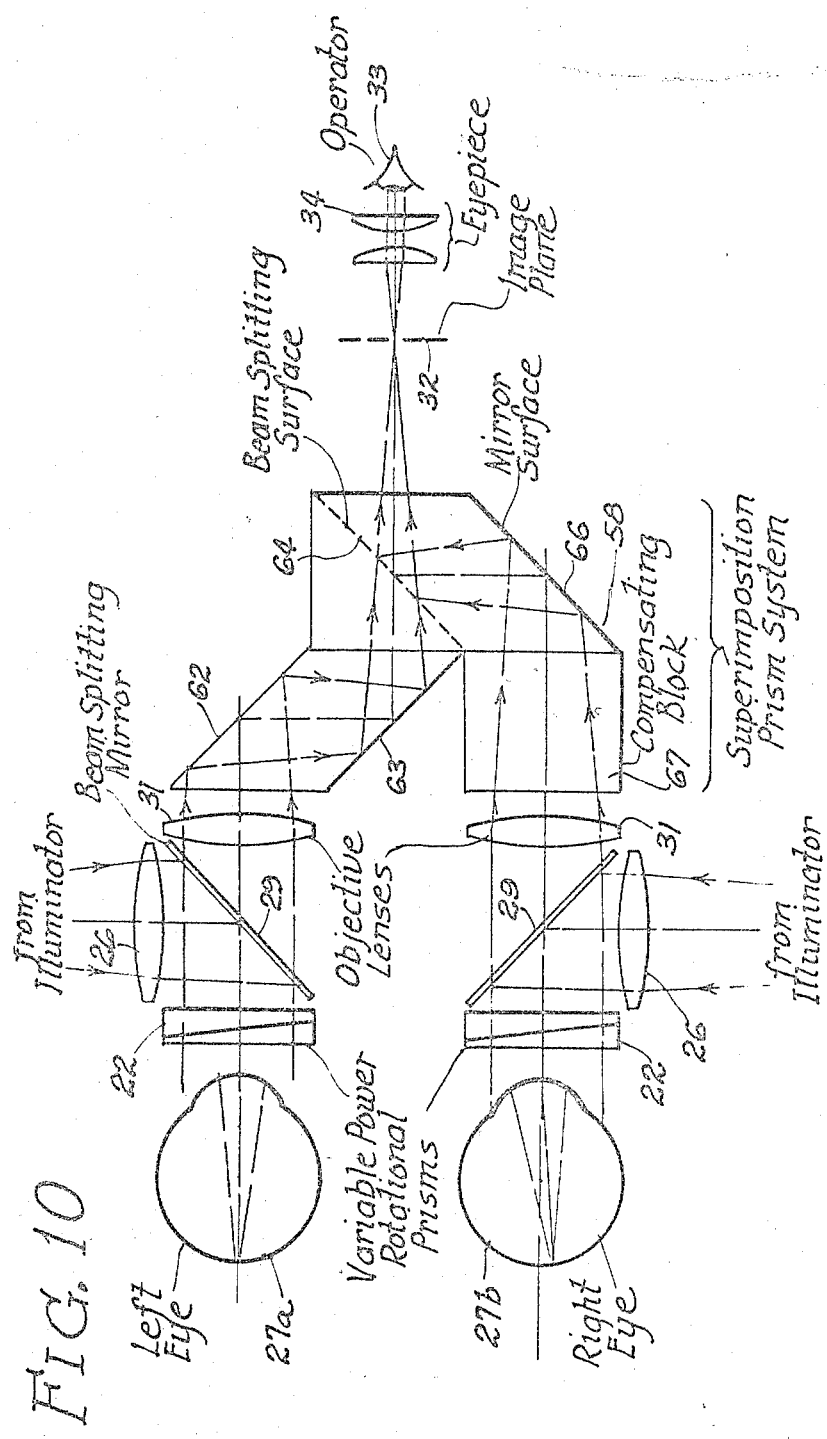
FIG. 10
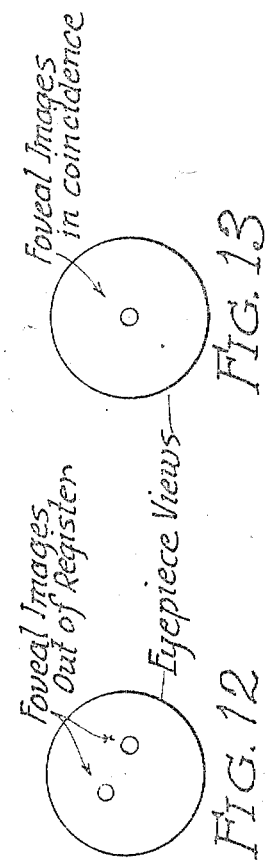
FIG. 11
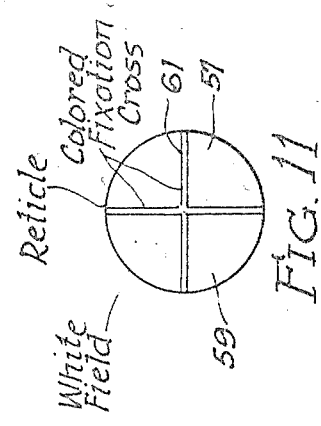
FIG. 12
FIG. 13

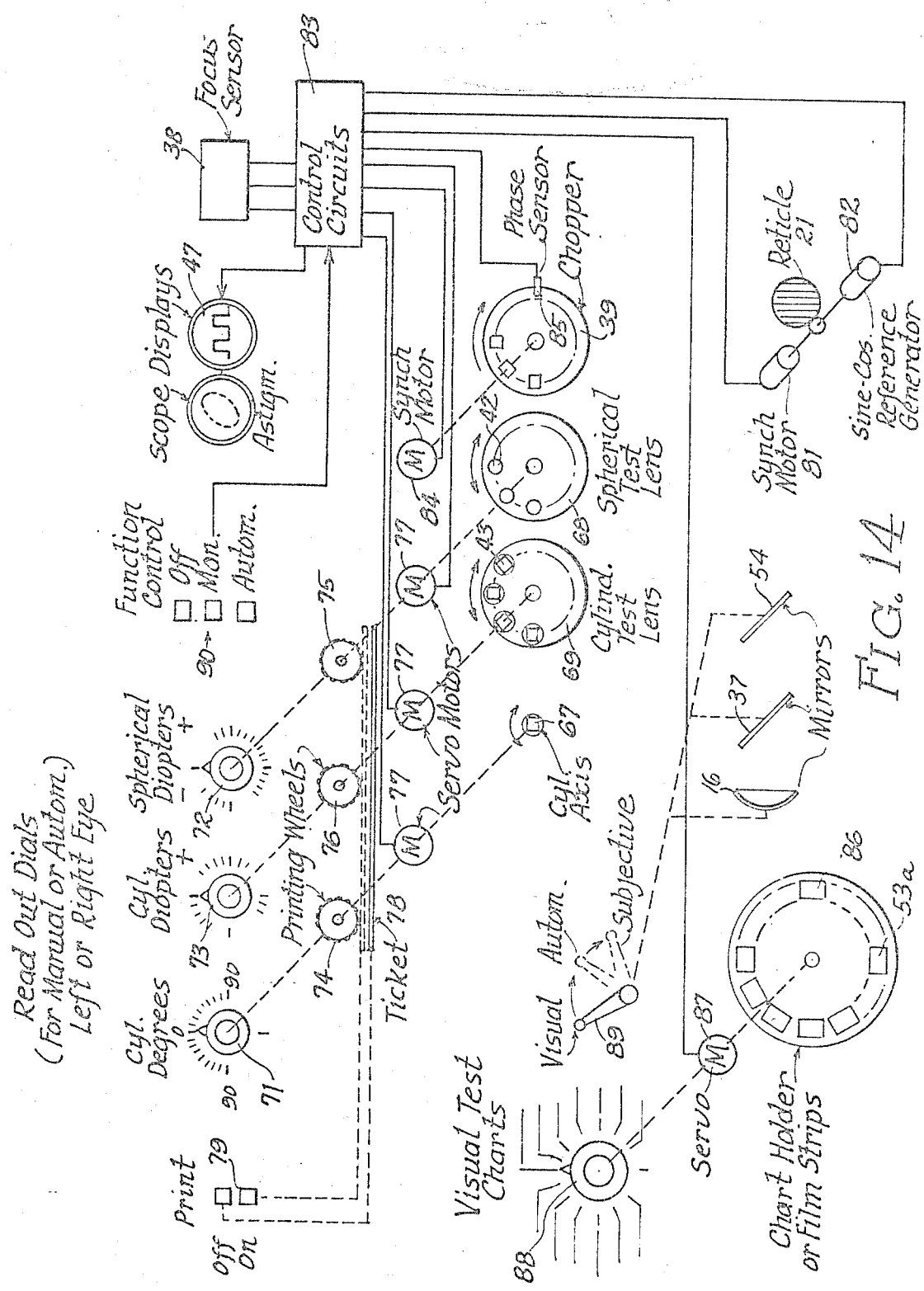

3,524,702
APPARATUS FOR OBJECTIVELY AND AUTOMATICALLY REFRACTING THE EYE
John G. Bellows, 211 Park Ave., Glencoe, Ill. 60022, and Howard C. Borough, Glen Ellyn, Ill.; said Borough assignor to said Bellows
Filed Sept. 6, 1968, Ser. No. 767,573
Int. Cl. A61b 3/10
U.S. Cl. 351—6
4 Claims

ABSTRACT OF THE DISCLOSURE

An apparatus for objectively testing an optical system which includes a lens and a photo sensitive surface. The apparatus comprises a source of radiant energy for producing a beam, a reticle adapted to be illuminated by the beam and a projection lens, all disposed in the optical path of the test optical system. The beam is adapted to pass through the reticle, the projection lens and the test optical system and to project the reticle image on the photo sensitive surface. The apparatus further includes an objective lens, a focal plane and a beam splitter, all in an optical path intersecting the first mentioned optical path. The beam reflected from photo sensitive surface is reflected from the beam splitter and passes through the objective lens to form an image on the focal plane. Means for refractively correcting the test optical system are included.

---

This invention relates to an apparatus for objectively and automatically refracting the eye.

While the invention will be described in terms of its application to the testing and refractive correction of the human eye, it will be understood that it has application in the collimation or calibration of other optical systems.

Present clinical refraction of the human eye relies upon the objective determination of the exterior conjugate focal point of the eye (the punctum remotum) through the use of a parallax test and the observation of the "reflex action" of a light pattern in the pupil of the patient's eye. This clinical determination requires considerable practice and experience to properly interpret and administer.

The foregoing disadvantage is obviated with the present invention which is capable of automatically determining visual abnormalities of the human eye, requiring only the operational skills of trained technicians for set up, patient alignment and determination of the patient's suitability for automatic testing. It is contemplated that probably 90–95 percent of the patients requiring visual correction could be handled with such an apparatus. It is recognized that there would be a small percentage of patients which would require the special skills of an ophthalmologist due to excesive corrections or pathological conditions.

Accordingly, it is an object of this invention to provide an apparatus for objectively testing refractive and related properties of the eye and correcting abnormalities, in a substantially automatic manner, without the need for substantial operator skill.

Another object of this invention is the provision of an apparatus of the foregoing character in which the testing and correction may be carried out at a speed and with a degree of accuracy not heretofore obtainable according to prior methods.

Other and further objects and advantages of this invention will become apparent from the following description when the same is considered in connection with the accompanying drawings.

The apparatus, in accordance with the invention, utilizes the principle of projecting an optical image into the eye and examination of the reflected image from the retina to determine the sharpness of focus. This sharpness of focus may be determined by a suitable electro-optical sensor to provide a meter readout of servo-system error signal, or it may be determined visually by an operator. The apparatus has the capability of determining the magnitude of any degree of ametropia and the axis of the astigmatism in the patient's eye. The apparatus determines the interior conjugate focal point of the eye, or more correctly determines the refractive correction required to make the interior conjugate focal point and the retina coincide. This position of coincidence is optically a condition of maximum acuity. It will be understood that with certain patients there may be a difference between the objective and the patient's subjective determination of maximum acuity which would indicate a requirement for additional ophthalmological tests.

Incorporated in the apparatus are a number of visual test charts for the patient's subjective determination of visual capability with the objectively determined correction. The visual test charts are optically projected into the eye through the same optical system used for the refractive determination and are adjustable so as to optically appear at infinity or some near distance, such as 33 centimeters. In order to obtain binocular fusion of the independent left and right eye charts used, the usual double rotational prism wedges are incorporated which permit angular control of the optical axes to correct for any extra-ocular muscle imbalance in the patient. Some form of refractive optical lens system is required between the projection-measurement optics and the patient's eye. This could take the form of test lenses in a frame for a manual mode, or a turret of variable power lenses for an automatic or semi-automatic system. For a completely automatic system the introduction of a specialized variable focal length variable anamorphic power lens system would be the most efficient and accurate. This variable power lens would be capable of providing the proper spherical and cylindrical power and through an axial rotation would provide the correct axis. The continuous variable power of the system would provide much more accurate correction than available in standard practice which is usually about ±0.25 diopters. The apparatus of this invention provides the capability to objectively determine a patient's range of accommodation, to measure the magnitude of the chromatic aberration, and provides a visual examination of foveal or retinal correspondence and tests for malingering, as well as a photographic record of the patient's retina.

In its most complete form this invention would be capable of automatically determining the refractive state of the human eye and providing a printed prescription card output.

In the drawings:

FIG. 1 is a schematic drawing illustrating an embodiment of the invention.

FIG. 2 is an elevational view of a rotatable disc light chopper.

FIG. 3 is an elevational view of a reticle.

FIG. 4 is an elevational view of another type of reticle.

FIG. 10 is a schematic view illustrating means for determining retinal correspondence.

FIG. 11 is an elevational view of a reticle.

FIG. 12 is a representation of an eye piece view illustrating retinal disparity.

FIG. 13 is a similar view illustrating retinal correspondence.

FIG. 14 is a schematic view illustrating a system embodying the invention.

Figure 5:
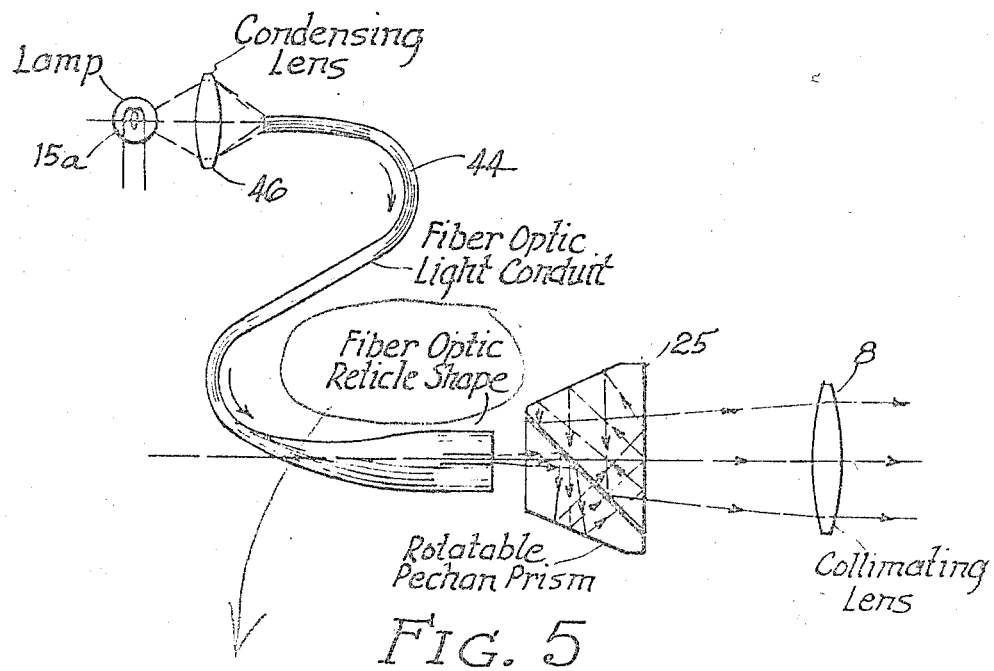
FIG. 5 is a schematic drawing of a modified arrangement utilizing a fiber optic light conduit and Pechan prism.

Referring to the drawings, and particularly to FIG. 1, there is shown an optical system constituting one embodiment in accordance with our invention, although it will be understood, as with most optical systems, that there are a number of spatial configurations and component combinations which will yield similar results.

An illumination system consisting of a suitable light source, such as an incandescent lamp 15, providing a source of radiant energy, a spherical mirror 16, a condensing lens system 17 shown schematically as a simple lens, and two folding mirrors 18 and 19 illuminates a rotatable reticle 21. The cross-shaped reticle pattern formed by two pairs of closely spaced lines and illustrated in FIG. 3 is desirable for a visual operator examination, since the cross pattern may be used for the determination of astigmatism and sharpness of focus. Rotation of the reticle may be effected manually by rotating the reticle or optically, through the introduction of a Pechan prism 25 and rotating the same about the optical axis. Rotation of the reticle 21 is required for the determination of a condition of astigmatism. The Pechan prism 25 when rotated axially causes the image of the reticle 21 to appear to rotate at twice the rotational speed of the prism. The use of the Pechan prism is desirable, since it permits a considerable physical compression in the dimension of the apparatus.

For an automatic mode of operation, the reticle pattern illustrated in FIG. 4 is more suitable, since this type of pattern with a large number of closely spaced bars with the space width equal to the bar width forms an image of the kind required by several electrooptical focus sensors, as will be hereinafter explained. By employing bars which can be rotationally oriented it is possible to determine if a patient's eye focuses differently in the various axial positions. If so, this would indicate a condition of astigmatism.

The light rays 23 which emerge from a point on the reticle 21 are intercepted by the collimation lens 26 and are refracted and made parallel. This condition is achieved when the reticle 21 is located at the focal plane of the collimation lens 26. When the reticle 21 is properly located at the focal plane of lens 26 the reticle image when viewed from the position of the patient's eye 27 appears to be at infinity. For an emmetropic eye the reticle image will be formed on the retina R and the patient will sense a sharply focused image. A myopic eye will focus the image in front of the retina and a hypermetropic eye will focus the image behind the retina. Actually, in the latter case, the light strikes the retina R before coming to a focus. In either case, the patient would sense an out of focus image, the magnitude of the focus error, of course, depending on the magnitude of the abnormality. This assumes no accommodation on the part of the patient.

A small portion of the light which strikes the retina R is reflected back through the patient's eye lens structure L. This emerging light, indicated by the numeral 28, for an emmetropic eye, is condensed by lens 26 and travels back in the direction of the source 15. However, it is intercepted by a beam splitter 29 which directs approximately one-half of the light toward the objective lens 31 which brings it to a focus at the focal plane 32 where it can be visually observed by an operator 33 through an eyepiece 34. The image, thus viewed, is a superposition of an image of the reticle and the image on the patient's retina. With the reticle 21 in position, only the illuminated portion is visible as a cross or bar chart. With the reticle 21 removed and with a large illuminated area at the reticle position the operator may examine an extended portion of the retina or photograph it with any appropriate camera attachment.

For automatic sensing, a reticle 36 of the type illustrated in FIG. 4 is employed in the position of reticle 21 and a folding mirror 37 is introduced into the optical path to direct the image to an electrical electro-optical focus sensor 38. Such instruments are conventional and have been described in the literature.

Since only a small part of the incident light is returned by the retina R to the focusing system and a relatively large amount of internally scattered light reaches the focus sensor 38 as non-image forming stray light, it is desirable that the optical light path be mechanically modulated after passing through the refractive correction system and before entering the patient's eye. This modulated signal from the retina R is then electronically separated from the unmodulated signal caused by the non-image forming light. Such modulation may be accomplished through the use of a rotating mechanical chopping disc 39 of the type illustrated in FIG. 2. Modulation may also be accomplished by other techniques, such as the use of tuning-fork type modulators, depending upon the configuration requirements. In order to provide synchronous electronic processing a reference signal is required to be derived from the modulator, either from an optical or magnetic sensor. The control of stray light reflected from the refractive correction system also may be controlled by the use of a polarizer and an optical quarter-wave plate 41 to eliminate specular reflections and to transmit the diffusely reflected image from the retina.

In accordance with this invention, there are provided corrective refractive lens systems, indicated generally by the numerals 42 and 43, which are disposed between the beam splitting element 29 and the patient's eye 27. Such lens systems, one comprising a series of spherical lenses 42, and the other, a series of cylindrical lenses 43, may be carried in rotatable turrets so that the lenses may be moved in sequence into registration with the optical axis of the system. It will be understood that each such system may be in the form of a continuously variable power optical system which could be easily mechanised into a servo-controlled automatic system and would provide an improved refractive measurement, since it would not be limited by the discrete power steps of the turret type system. In operation, the powers of the refractive systems are varied until the optimum focus is determined, either visually, or by the operator or by the use of the focus sensor 38. In a manual mode, such adjustment is accomplished by the operator selectively moving the turret to effect registration of specific lenses with the optical axis. In an automatic mode this may be accomplished by utilizing the error signal generated by the focus sensor 38 to control the refractive power of the correction system.

In testing for astigmatism the eye is refracted for spherical error as well as possible and then the reticle 21 is rotated and any variation of focus sharpness is different axial orientation is an indication of astigmatism. In carrying out this test manually this condition can be determined by the axial position of the reticle in the best and worst focus position and then separately determining the spherical power required to obtain maximum sharpness for these two conditions. The difference in the spherical powers is the amount of cylindrical correction required and the axial position of the cylinder is determined from the rotational position of the reticle. This correction then can be introduced into the refractive lens system by introducing the appropriate cylindrical lens into the optical axis by rotation of the turret. Where a continuously variable power cylindrical lens system is employed, the portion of the system which will effect the correction of the abnormality is caused to be moved into registration with the optical axis.

Figure 6:
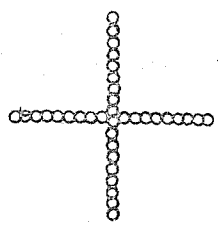
FIGS. 6 and 7 are elevational views illustrating different reticle shapes of the fiber optic light conduit illustrated in FIG. 5.
Figure 7:
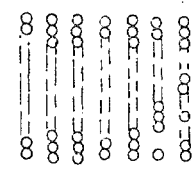

FIG. 5 illustrates a fiber optics modification to provide the illumination and reticle for the collimation portion of the system. The lamp 15a illuminates one end of a fiber optic light conduit 44 through the condensing lens 46. The light emerges from the other end of the fiber optic conduit which has been spatially arranged to form the desired reticle configuration such as illustrated in FIGS. 6 and 7. Through the proper orientation and bifurcation of the fiber bundle the two reticle configurations may be combined into the same physical unit with appropriate switching masks over the illuminated end.

Figure 8:
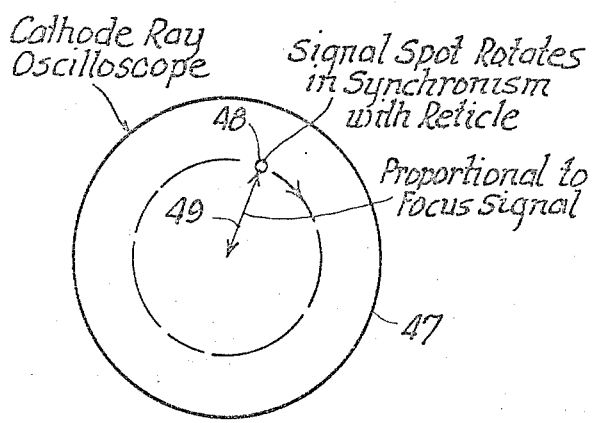
FIG. 8 is an elevational view of the screen of a cathode ray tube incorporated in the apparatus.
Figure 9:
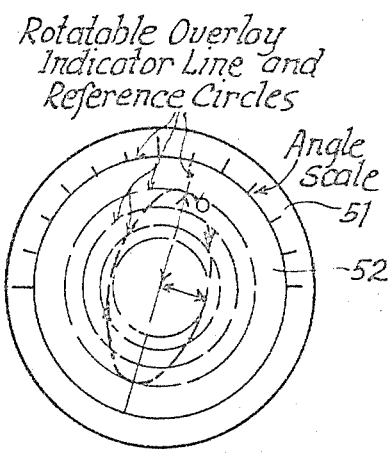
FIG. 9 is a view similar to FIG. 8 illustrating a condition of astigmatism registered on the screen.

A modified mode of readout and sensing of astigmatism may be through the use of a simple cathode ray tube oscilliscope 47 display, illustrated daigrammatically in FIG. 8 where the spot 48 is swept in a circular scan in synchronism with the reticle 21 through an appropriate driving signal derived in the reticle drive system with the focus sensor signal controlling the radius 49 of the scan. For a patient with astigmatism the oscilloscope trace would appear as in FIG. 9 as an elliptical trace where the major axis of the ellipse is the astigmatic axis of the eye and is read off of a calibrated angle scale 51. The reading of the angle may probably be facilitated by the use of a rotatable overlay 52 which also contains reference circular marks. The magnitude of the astigmatism is indicated by the ellipticity but is not an accurate measure. The refractive correction lens cylinder of approximate power is introduced into the system at the axis angle indicated and the power and axis adjusted until the oscilloscope trace becomes a circle indicating proper focus at all axial positions. This is aided by the circular reference marks on the overlay 52. Through electronic sensing of the focus signal the oscillating component in phase with the reticle rotation may be used for a servo error signal to automate the cylindrical correction system.

After an objective refraction is completed for both eyes, there usually is a desire for a subjective determination of the acceptability of the correction prescribed. This may be accomplished by the use of visual test charts 53a or 53b located internally of the apparatus. A suitable location for such charts is illustrated in FIG. 1 wherein a hinged folding mirror 54 is disposed in the optical path between the beam splitter 29 and the focal plane 32 to direct the optical path toward the visual test charts 53a and 53b which are illuminated from behind by the lamp 15. In this arrangement the illumination is effected by the same lamp 15 used for the reticle 19, since the reticle is not illuminated during the visual subjective tests. The spherical mirror 16 is rotated to the broken line position and the condensing lens 56 uniformly illuminates the charts 53a or 53b. The position of the far field chart 53a is at the focal plane of the objective lens 31 which optically places the target at infinity as viewed by the patient. The near field chart 53b illustrated in broken lines, is disposed in a position inside the focal plane. This position may be calculated and is dependent on the focal length of the objective lens 31. The position of the near field test chart is usually adjusted so that it appears optically to be at about 33 cm. from the patient's eye. It will be understood that several of such test charts are employed to handle the variety of tests usually conducted and that such charts may be carried in a turret or may be in the form of a film strip.

While only a single optical system has been illustrated and described, it will be understood that our invention contemplates the use of two such systems in a single apparatus so that binocular visual acuity tests may be made on a patient. By incorporation of appropriate charts, in the locations of charts 53a or 53b, the patient's phoria may be measured to determine any abnormality in the natural viewing axis of each eye. In such testing the double rotational prisms 22 are adjusted until the patient is able to fuse the appropriate images.

The apparatus of our invention comprising two optical systems may be utilized with additional components in making an objective measurement of the patient's retinal correspondence. In FIG. 10 which diagrammatically illustrates the apparatus, the positions of the illumination and observational optical paths have been interchanged and the refractive control elements have been eliminated for greater clarity, although it will be understood that the function and structure of the apparatus is similar to that hereinabove described, accordingly corresponding parts will be identified by corresponding reference numerals.

The additional components hereinabove referred to include a special bright field reticle 57 (FIG. 11) and a superimposition prism system 58. It will be understood that these components are part of the apparatus and may be moved into and out of operational positions, as desired.

Reticle 57 illustrated in FIG. 11 is intended to be positioned in the same location as reticle 21 shown in FIG. 1 and provides an area of illumination 59 on the retina R for the operator identification of the foveal region of the eye while providing the patient with a fixation target in the form of a cross 61 or other suitable pattern. The superimposition prism system 58 is located between the focal plane 32 and the objective lenses 31.

The apparatus just described functions as follows: Reflected light from the retinas R of the two eyes 27a and 27b are each refracted by the objective lenses 31 and the two images are combined by the superimposition prism system 58. The optical path from the left eye 27a is stepped laterally to the side by the two mirror surfaces 62 and 63 and through the beam splitting surface 64 to form an image at the image plane 32. The optical path from the right eye 27b is similarly stepped laterally to the side by a reflection from the mirror surface 66 and the beam splitter surface 64 to coincide with the optical axis of the left eye optical path to form an image also at the image plane 32. In order to have the two images in the same plane it is necessary to utilize an optical compensating block 67 so that the optical paths of the left and right eyes travel through an equal path in glass. For maintenance of optical alignment it is desirable to have the superimposition prism 66 fabricated as a cemented glass optical element. The operator 33 observes the two superimposed images through eyepiece 34. The image which is thus viewed may appear as in FIG. 12, if the two foveal areas are out of register and are not superimposed. In most cases one of the foveal areas will be centered. The double rotational prism 22 for the non-centered eye is then adjusted to provide the necessary prism magnitude and angle to obtain coincidence of the two foveal images, as shown in FIG. 13. The position of each prism 22 indicates the actual eye viewing axis. The positions of these prisms may be indicated on convenient dials, not shown, and, if desired, may be also printed out on a prescription card through a servo-coupling system. By incorporation of standard stereo acuity charts for the left and right eye systems the patient's stereo perception may be measured.

The chromatic aberration of a patient's eye may be measured after a prescription is determined for white light. To accomplish this a narrow band spectral filter is inserted between the lamp 15 and the reticle 21 or a special spectrally emitting lamp, such as mercury or other vapor lamp is substituted for the lamp 15. Using selected spectral lines spaced across the visible spectral region a focus sensor reading is taken for each spectral value. A plot of this focus signal as a function of spectral wave length would indicate the character and extent of the chromatic aberration of the patient's eye. To quantitively determine the range of accommodation of the patient it is necessary to use an active eye which has not been dilated. The patient is asked to focus on the reticle target and with the proper correction for astigmatism the spherical power of the refractive system is slowly changed and the focus sensor signal is recorded as a function of refractive power. Typically, the range of interest would be from the maximum focus sensor reading to about one-tenth of that value on both the plus and minus side of proper correction.

Through suitable operational procedures it is possible to test for malingering in a patient. This test is made in the binocular visual acuity test by slowly varying the power of the refractive correction system in the "good" eye path and observing the patient's ability to read the test chart. If the patient can continue to read the chart after the introduction of a refractive power far in excess of this accommodation ability there would be a strong indication of malingering and further ophthalmological testing would be indicated.

Through the incorporation of standard color blindness charts in substitution of charts 53a and 53b it would be possible to conduct these tests on patients in the usual manner of their subjective determination of the pattern in the chart. These charts may be incorporated in a film strip or turret.

A mechanical form of apparatus in accordance with our invention and having a data printout capability is diagrammatically illustrated in FIG. 14. The refractive correction elements 42 and 43 which may be carried in turrets 68 and 69 or may be part of continuously variable systems, as hereinabove mentioned, as also element 67, are coupled to suitable dial indicators 71, 72 and 73 and to mechanical printing wheels 74, 75 and 76, respectively, by suitable mechanical and servo means, indicated generally by numeral 77. After a refraction has been completed, upon actuation of a push button 79, the printing wheels are caused, by electro-mechanical impulses, to print a readout or prescription on a ticket 78.

The reticle 21 is driven by a synchronous motor 81 which is coupled to a sine-cosine reference generator 82 which provides the appropriate signal to generate the circular scan on the oscilloscope 47 after suitable electronic processing in the control circuits 83. The mechanical modulator 39 is driven by a synchronous motor 84 and a phase sensor 85 generates a signal which is used in the control circuits 83 to synchronously process the electrical signal from the focus sensor 33. A plurality of visual test charts 53a or 53b is carried in a turret 86 which is driven by a servo motor 87. The motor positions the proper chart in the optical system upon selection by the operator of the chart on the indicator dial 88. A number of mirrors such as 16, 37 and 54 which must be introduced into the system for appropriate tests, as hereinbefore explained, may be moved into and out of operative position by linkage means controlled by a lever 89. The functional control electrical switches are indicated generally by the numeral 90.

We claim:

1. An apparatus for objectively and automatically refracting the eye, comprising means for generating a source of radiant energy, means for introducing into the eye radiant energy of known spatial relationship, means comprising a reticle for spatially distributing said radiant energy, means for concentrating said radiant energy on said reticle, means for analyzing the spatial relationship of that portion of the radiant energy which is reflected from the retina of the eye, means for continuously varying the spatial relationship of the radiant energy in response to analysis of said reflected radiant energy, means for projecting the image of said reticle into said eye through said means for continuously varying the spatial relationship of said radiant energy, said concentrating means, said reticle, said projection means and said means for varying the spatial relationship all being disposed along an optical axis substantially coincident with the optical axis of said eye in the order stated, said concentrating means comprising a concave mirror disposed behind said source of radiant energy and at least a convergent refractive lens disposed in front of said source of radiant energy, both being disposed on said optical axis, said reticle being disposed on the optical axis and being rotatable about said axis, said projection means comprising a convergent refractive lens disposed on the optical axis and longitudinally spaced a distance of one focal length from said reticle, said means for continuously varying the spatial relationship of said radiant energy comprising a lens system of continuously variable spherical and cylindrical power, the cylindrical axis of the variable power lens being rotatable about the optical axis, the means for analyzing the spatial relationship of the radiant energy which is reflected from the retina of the eye comprising a beam splitting mirror disposed in the optical path between the projection lens and the lens system for separating the reflected radiation from the projected radiation, a convergent refractive lens disposed on the optical axis of the beam splitting mirror for forming an image of the image of the reticle on the retina, means responsive to the sharpness of focus of said image for analyzing the sharpness of focus of said image, means responsive to said sharpness of focus for controlling said continuously variable refractive spherical power of said lens system to achieve optimum sharpness of focus, and means responsive to said sharpness of focus in conjunction with the rotation of said reticle for controlling said continuously variable cylindrical power of said lens system to achieve optimum sharpness of focus.

2. The invention as defined in claim 1 wherein the reticle is formed by a shaped transforming fiber optic bundle consisting of nominally constant diameter clad fibers arranged in a reticle geometry configuration at one end and a circular geometry at the other end, said circular geometry end being efficiently illuminated by the compact region of radiant energy formed by said source of radiant energy and said means of concentrating said radiant energy.

3. The invention as defined in claim 1 wherein the rotation of said reticle about said optical axis is accomplished by optical prism means.

4. The invention as denfied in claim 1 wherein the projection and said analysis systems are interchanged with respect to said beam splitter.

References Cited

UNITED STATES PATENTS

| | | | |
|---|---|---|---|
| 1,116,529 | 11/1914 | Allen | 351—6 |
| 2,095,235 | 11/1937 | Ames | 351—6 X |
| 2,968,994 | 1/1961 | Shurcliff | 356—126 X |
| 3,068,745 | 12/1962 | Peck | 351—16 |
| 3,136,839 | 6/1964 | Safir | 351—6 X |

FOREIGN PATENTS

| | | |
|---|---|---|
| 893,990 | 4/1962 | Great Britain. |

DAVID SCHONBERG, Primary Examiner

P. A. SACHER, Assistant Examiner

U.S. Cl. X.R.

351—13, 16; 356—126